Aug. 14, 1962 C. J. ARNDT 3,049,219
IMPROVEMENTS IN FLEXIBLE TROUGHING IDLER ASSEMBLIES
Filed Sept. 9, 1958 3 Sheets-Sheet 1
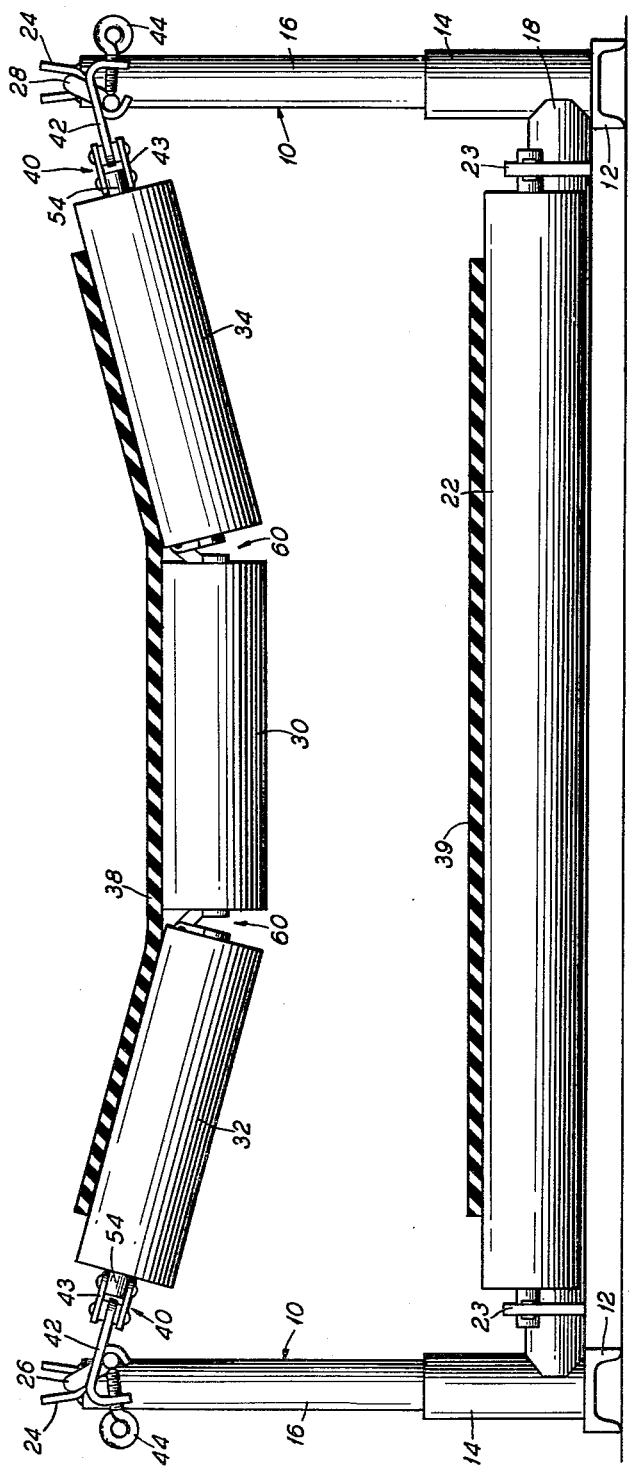
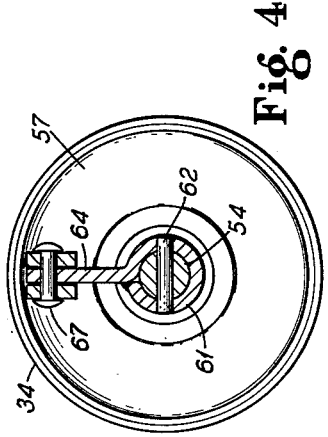
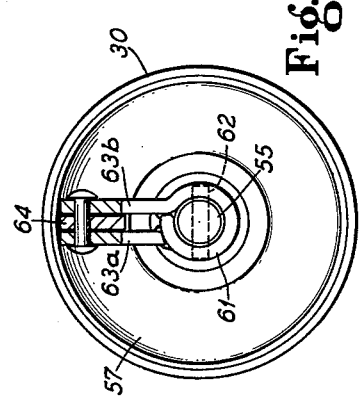
INVENTOR.
Charles J. Arndt
BY
Murray A. Gleeson
ATTORNEY INVENTOR.
Charles J. Arndt
BY
Murray A. Gleeson
ATTORNEY Aug. 14, 1962 C. J. ARNDT 3,049,219
IMPROVEMENTS IN FLEXIBLE TROUGHING IDLER ASSEMBLIES
Filed Sept. 9, 1958 3 Sheets-Sheet 3

INVENTOR.
Charles J. Arndt
BY
Murray G. Gleeson
ATTORNEY

United States Patent Office 3,049,219
Patented Aug. 14, 1962

3,049,219
IMPROVEMENTS IN FLEXIBLE TROUGHING IDLER ASSEMBLIES
Charles J. Arndt, Harvey, Ill., assignor to Goodman Manufacturing Company, Chicago, Ill., a corporation of Illinois
Filed Sept. 9, 1958, Ser. No. 760,006
4 Claims. (Cl. 198—192)

This invention resides in the field of troughing roller assemblies and has especial application to such assemblies used to support belts, or other continuous or semi-continuous flexible platforms for moving materials along a predetermined path. More particularly the invention relates to a novel structure for connecting adjacent rollers.

A recent innovation in the conveying field has been the development of non-rigid roller conveying assemblies upon which a belt or other flexible conveying platform is entrained. These conveyors are able to move large quantities of raw material such as coal or ore at rapid rates over long distances. An example of such a conveyor is illustrated in Patent No. 2,773,257 issued December 4, 1956, to J. Craggs et al. In the type of structure there illustrated, a pair of flexible strands such as wire ropes, are disposed in side by side generally parallel relationship along a predetermined course, such as a mine run, and supported at intervals by supporting stands. Extending transversely to and supported by the flexible strands are troughing roller assemblies located at conveniently spaced distances. These roller assemblies usually include a center load carrying or belt training roller, which acts as a centering roller, and a pair of end or wing rollers. When there is no load on the conveying belt, the rollers are inclined only slightly with respect to one another. The rollers flex inwardly and downwardly to form a trough under loaded conditions, with the center roller carrying the bulk of the load.

In present roller assemblies the wing and center rollers are pivoted about a point lying substantially on the projection of the central axes of the adjacent roller shafts. When the rollers flex under load conditions for example, and assuming that the center roller stays substantially horizontal, the upper inner edge of the wing roller moves inwardly towards the upper outer edge of the center roller about the pivot point as a center. Consequently, it is necessary to locate the pivot point far enough from the edge of each of the rollers so that the upper inner edge of the wing roller will not contact the upper outer edge of the center roller when the rollers flex. As a result, there is a long unsupported span of belt between the rollers when the roller assembly is in unloaded or substantially flat condition.

The span of unsupported flexible conveyor belt between the rollers will vary from position to position of the rollers. In general, the further apart the rollers, the greater the unsupported span between them, but the ratio of unsupported span to the distance between rollers is not constant due to the inherent stiffness of the belt. When, for example, there is only a small distance between the upper interfering edges of the rollers, there may be a substantial unsupported span of conveyor belt because the belt is not flexible enough to follow the exact contour of the rollers. For all practical purposes, however, the relationship between the unsupported span of the conveyor belt and the distance between the adjacent roller edges may be expressed in terms of the distance between the upper edges of the rollers in a loaded and unloaded condition. The ratio of these distances is called the bridge effect.

Another disadvantage in some present roller assemblies is that the contact between the belt and center roller may be substantially lessened as the upper inner end of the wing roller moves upwardly with respect to the upper outer end of the center training roller. This is due to the arching of the wing roller about the pivot point, and the resultant lifting of the belt above the end of the training roller. Since the bulk of the training action is performed by the center roller, the smaller the contact between the center roller and the conveyor belt the less the training effect exerted on the belt, and consequently the greater is the tendency for the belt to become detrained.

Accordingly, a primary object of the invention is the provision of a new and novel roller connecting assembly which substantially reduces the gap between adjacent rollers in their non-flexed or unloaded position while maintaining the necessary loaded condition clearance.

Another object is the provision of a pivotal connecting assembly for interconnecting adjacent rollers which reduces the unsupported span of conveyor belt between the ends of the rollers throughout all relative angular positions of the rollers while permitting a broad range of relative pivotal movement between rollers.

Yet a further object is the provision of a roller pivotal connecting assembly which reduces the lifting effect of the belt by the wing roller due to the arching of the upper inner edge of the wing roller.

A further object is the provision of a roller assembly in which the training effect of the primary training roller or rollers under load conditions is increased by maintaining the flexible conveying platform in contact with the primary training roller over substantially the entire length of the roller.

Another object is the provision of a pivotal connecting assembly for interconnecting adjacent roller assemblies in a troughing roller assembly whereby the pivot point between the roller assemblies is offset with respect to the midpoint therebetween.

Yet a further object is the provision of a troughing roller assembly which reduces the unsupported span between the upper interfering edges of the roller assemblies under all load conditions.

Other objects will appear from time to time during the course of the ensuing specification and claims.

The invention is illustrated more or less diagrammatically in the following drawings wherein:

FIGURE 1 is an elevation of a troughing roller assembly with its supporting structure;

FIGURE 3 is a view taken along the line 3—3 of FIGURE 2;

FIGURE 4 is a view taken along the line 4—4 of FIGURE 2;

Like reference numerals are used to indicate like parts throughout the specification.

Figure 2:
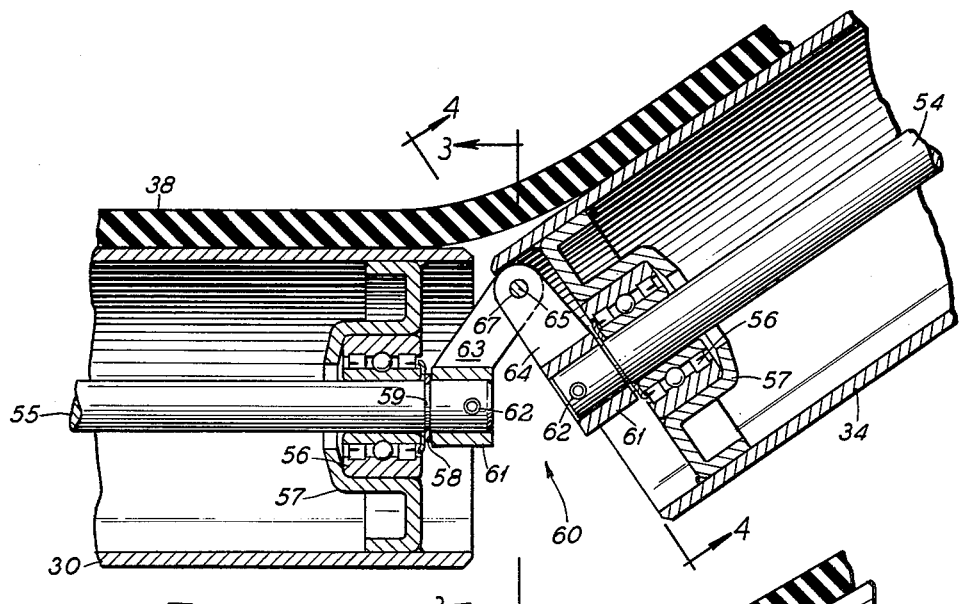
FIGURE 2 is a partial view of the adjacent ends of the center and right wing rollers of FIGURE 1 with parts broken away.

Referring to FIGURE 1, a wire rope and idler assembly is shown in an unloaded condition. The rope and idler assembly supporting stand 10 includes a base or foot 12 and a pair of tubular members 14 and 16. Upper tubular member 16 may be telescopically received within lower member 14 to permit adjustment of the upper end of the stand. Any suitable locking and securing means, not shown, may be used to position the tubular members with respect to one another. A spacing bar 18, which may be a horizontal channel, extends between the tubular members 14. The return roll assembly includes a return roller 22 carried by a suitable supporting structure 23 which may conveniently be connected to the spacing bar 18.

A U-shaped saddle member 24 is welded or otherwise suitably secured to the upper end of tubular member 16. A pair of flexible strands 26 and 28, such as wire ropes or the like, are received within the saddle and placed under tension by any suitable tensioning means.

The troughing or carrying idler assembly consists in this instance of three rollers of subtantially equal diameter suspended between the flexible strands. A center load carrying or training roller 30 is flanked by left and right wing or end rollers 32 and 34 respectively. In this instance the rollers are supported on a dead shaft and the abutting shaft ends are joined by pivotal connecting assemblies 60 which will be described later in detail. In this assembly the roller shafts are non-rotatable but it will be understood that in other applications it may be entirely feasible to make them rotatable. The conveying reach of the conveyor belt is indicated at 38 and the return reach at 39.

The entire carying idler assembly is secured to the flexible strands by suspension assemblies 40, each of which consists of a hook 42 joined to the outer end of shaft 54 by a swivel link 43. A tightening eye bolt 44 threaded through the outer end of the hook forces the flexible strand 28 into an inwardly spaced seat.

Referring now to FIGURE 2, the center or training roller 30 and the right wing roller 34 are shown in a loaded condition. The rollers are carried by supporting shafts 54, 55 which are journaled in precision bearings 56. The bearings may be press fitted within central depressions in heads 57 and the heads may be welded or otherwise suitably secured to the rollers.

A pivotal connecting assembly joining the ends of shafts 54 and 55 is indicated generally at 60 and consists of a pair of rigid pivot members. Each member includes a collar 61 adapted to be slidably received on the shafts and non-rotatably connected thereto by a collar pin 62. Projecting arms 63 and 64 are secured to the collars by welding or other suitable means and project upwardly to meet at a pivot point 65 which is offset with respect to a line perpendicular to and located midway between the ends of the abutting shafts when the shafts are in a non-flexed position. The pivot point is also located upwardly with respect to the central axis of the shaft. The outer upper ends of the arms are joined by a connecting pivot pin 67 or any other suitable pivot means. Retaining rings 58 in the necks 59 of the shaft maintain the bearings in place and reenforce the collars to absorb axial shocks and reduce longitudinal play of the collars along the shafts.

In FIGURES 3 and 4 the structure of the projecting arms is illustrated. Although the particular structure utilized is not critical, it may be convenient to form arm 63 as a yoke, best seen in FIGURE 3, having left and right sides 63a and 63b respectively. Arm 64, best illustrated in FIGURE 4, may be formed as a single projecting member adapted to be loosely received within the projecting yoke 63.

Figure 5:
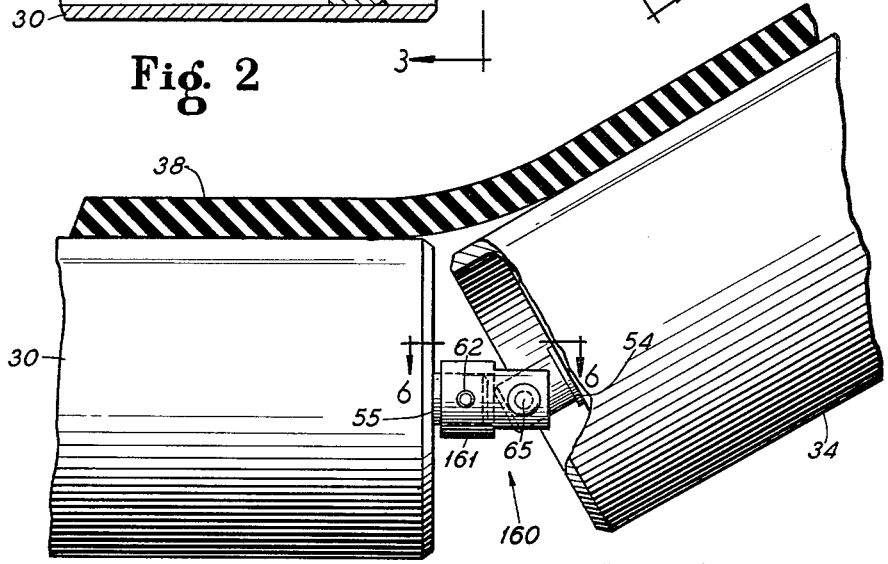
FIGURE 5 is a partial view of the adjacent ends of a center and right wing roller of a troughing idler assembly of the type shown in FIGURE 1 illustrating a modification of the invention.
Figure 6:
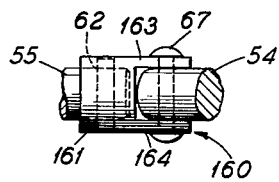
FIGURE 6 is a view taken along line 6—6 of FIGURE 5.

Referring now to FIGURES 5 and 6, a modification is shown in which the pivot point 65 of the connecting assembly 160 is offset toward the wing roller with respect to a line bisecting the distance between the ends of the rollers in a non-flexed condition. A connection is made between a connecting member received on shaft 55 directly to the end of non-rotatable shaft 54. The connecting member consists of a collar portion 161 non-rotatably secured to shaft 55 by connecting pin 62. A pair of arms 163 and 164 receive shaft 54 therebetween. Pivot pin 67 is received within suitable apertures in the arms to thereby provide a pivotal connection between the shafts. In effect, shaft 54 forms the single projecting arm 64 of FIGURE 2 and the collar structure 61 of shaft 54 has been eliminated.

Figure 7:
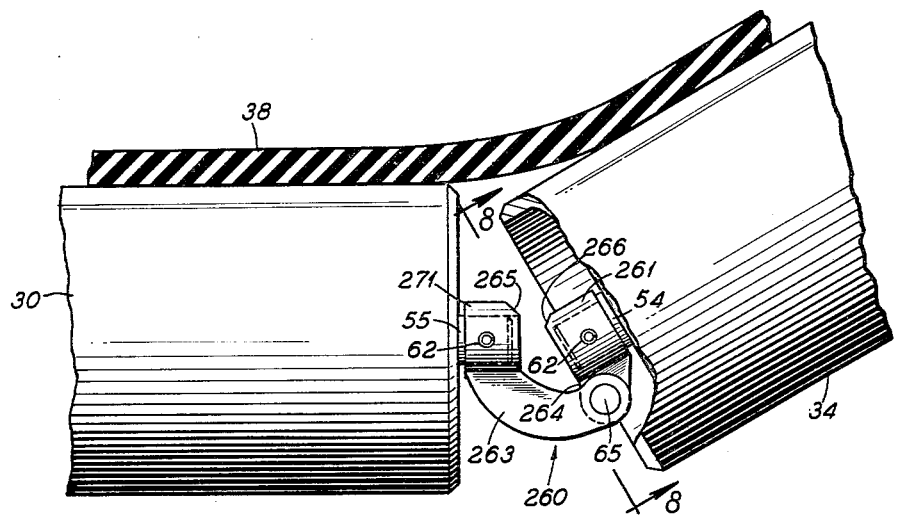
FIGURE 7 is a view similar to FIGURE 5 illustrating another embodiment of the invention.
Figure 8:
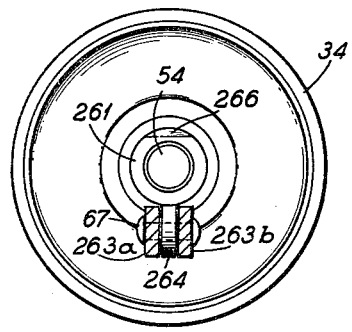
FIGURE 8 is a view taken along the line 8—8 of FIGURE 7.

Referring now to FIGURES 7 and 8, a further modification of the invention is illustrated in which the pivotal connecting point between adjacent rollers is downwardly offset. The connecting assembly 260 includes a right connecting member having a collar portion 261 adapted to be received on the end of wing roller shaft 54 and a downwardly projecting arm 264. The left connecting member consists of a collar portion 271 adapted to be received on the end of shaft 55 and a downwardly curved arm member 263. Collar pins 62 secure collars 261 and 271 non-rotatably to their respective shafts. At least the terminal end of arm 263 is divided to form a yoke having left and right sides 263a and 263b respectively which receive the arm 264 of the right connecting member. Since there will be an inward and slightly downward movement of collar 261 as the rollers flex, arm 263 has been curved to insure that there will be no interference between it and collar 261. As an extra precaution, the upper edges of the collars are chamfered as at 265 and 266.

Figure 9:
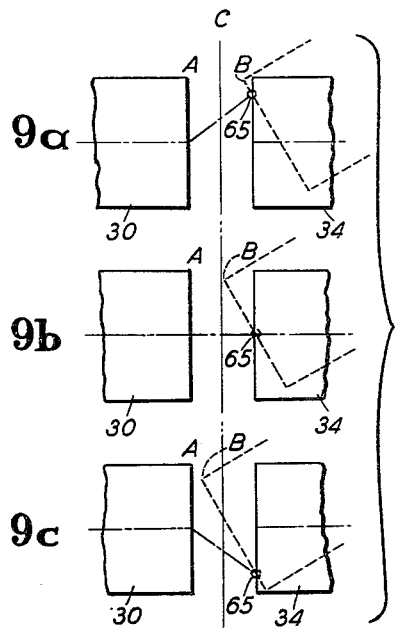
FIGURE 9 is a schematic illustration of the resulting clearances between the center and wing rollers in the three embodiments of the invention.

A diagrammatic illustration of the clearances resulting from the modifications illustrated in FIGURES 1 through 8 is shown in FIGURE 9. In each of FIGURES 9a, 9b and 9c, corresponding respectively to the modifications in FIGURES 1–4, 5–6, and 7–8, a center training roller 30 is shown in a level position and the right wing roller 34 is indicated in a non-flexed condition in solid lines and in a flexed position in phantom. The included angle between the shafts in the non-flexed and flexed conditions is equal in each figure.

Referring now particularly to FIGURE 9a, the upper outer edge of the training roller 30 is indicated diagrammatically at A and the upper inner edge of the wing roller 34 is indicated diagrammatically at B. The pivot point 65 is shown offset towards the wing roller with respect to line C which bisects the distance between the rollers. As wing roller 34 rotates about the pivot point 65, point B will immediately dip or duck downward as the angle of flexure increases. Because of the spacing required for the structural members, it is not feasible to locate the pivot point precisely at point B.

In this embodiment the bridging effect, which is defined as the distance between the upper outer edge of the training roller and the upper inner edge of the wing roller in a no load condition with respect to the distance between these points in a loaded condition, will be at an optimum. Because the upper inner edge of the wing roller dips downwardly immediately upon flexure there will be no tendency to lift the conveyor belt from the center roller, and it will maintain contact substantially out to the edges of the center roller. Since point B does not fall far below point A, the unsupported span of belt will be relatively short.

In FIGURE 9b the pivot point 65 is shown as offset along the central axis of the rollers. For the same amount of flexure, point B will attain a lower level from that assumed by point B in FIGURE 9a and better belt contact with the center roller will be maintained under all load conditions. Since point B dips further downward than in FIGURE 9a for the same degree of flexure, there will a slightly greater unsupported span between the rollers.

In FIGURE 9c pivot point 65 has been displaced downwardly with respect to the central axis of the rollers and offset to a point adjacent the lower inner edge of the wing roller. Point B will move to a lower position than either FIGURES 9a or 9b for the same amount of flexure, and belt contact is practically assured out to the extreme edges of the center roller. At the same time, the unsupported span of belt will be at a maximum, however.

The use and operation of the invention is as follows:

In flexible troughing idler assemblies in which the pivot point is located midway between the center and wing roller shafts and substantially on the projections of the central axes of the shafts, there is a possibility that the edges of the rollers will interfere as the rollers flex. In addition, due to the upward movement of the upper inner edge of the wing roller with respect to the upper outer edge of the center roller, the belt is lifted from the center roller and the training effect exerted on it is accordingly decreased.

By offsetting the pivot point towards one of the rollers, preferably the wing roller, the possibility of interference is substantially eliminated because the length of the arc traversed by the upper inner edge of the wing roller towards the center roller due to the outwardly positioned center of curvature is substantially smaller. Similarly the arching effect of the wing roller which positively lifts the belt above the level of the center roller is decreased or eliminated because there is little or no upward movement of the upper inner edge of the wing roller with respect to the upper outer edge of the center roller.

As the pivot point is lowered below the upper inner edge of the wing roller, there will be a greater tendency for interference between the ends of the rollers, but at the same time the downward movement of the upper inner edge of the wing roller increases so that the flexible belt will maintain better contact with the center roller.

In FIGURES 1 through 4 and 9a the pivot point is located near the upper inner edge of the wing roller and in this embodiment there will be the smallest likelihood of interference between rollers, yet the ducking of point B will be effective to permit good belt contact with the center roller under all conditions of load.

In FIGURES 7, 8 and 9c where the pivot point is downwardly offset, the ducking effect of point B will be at a maximum and the best possible belt contact will result. The possibility of interference between the rollers will be at a maximum, however.

FIGURES 5, 6 and 9b show a compromise in which the possibility of interference between the adjacent ends of the rollers may be kept within reasonable limits yet perfectly satisfactory belt training results follow.

Whereas three embodiments of the invention have been shown and described, it is to be understood that the showings are to be taken in an illustrative or diagrammatic sense only. There are many modifications to the invention which will be apparent to those skilled in the art and which are within the spirit of the invention. The scope of the invention, therefore, should be limited only by the scope of the hereinafter appended claims.

I claim:

1. In a troughing idler assembly for a belt conveyor, a plurality of roller supporting shafts disposed in generally end-to-end relationship, each shaft having a roller rotatably mounted thereon and a connection between adjacent shafts, the connection including pivot means offset longitudinally of the shafts with respect to the midpoint between the rollers in an unloaded condition, said offset pivot means causing the upper edge of the roller towards which the pivot means is offset to duck below the opposed upper edge of the adjacent roller when the idler assembly troughs in a loaded condition.

2. The troughing idler assembly of claim 1 further characterized in that the pivot means between adjacent rollers is additionally offset laterally with respect to the central axes of the rollers.

3. A pivotal connecting assembly for connecting adjacent rollers in a troughing roller assembly to thereby prevent interference between the upper abutting adjacent edges of the rollers in all normally deflected positions, said assembly including, in combination, a first collar engaging one of a pair of adjacent roller shafts, said first collar terminating in a pivot arm forming a pivot point offset longitudinally of the shafts with respect to the midpoint between the ends of the adjacent roller shafts, a second collar engaging the other of the pair of shafts, said second collar having a pivot arm extending generally outwardly from its associated shaft and terminating in a pivot point co-extensive with the pivot point of the first pivot arm, and a pivot member connecting the pivot arms to one another at the co-extensive pivot points to thereby permit flexing movement of the rollers and their respective shafts about the resulting pivotal connecting point to thereby enable the roller carried by the second roller shaft to duck downwardly beneath the other roller when said rollers deflect.

4. A pivotal connecting assembly for connecting adjacent rollers in a troughing roller assembly to thereby prevent interference between the upper abutting adjacent edges of the rollers in all normally deflected positions, said assembly including, in combination, a collar engaging one of a pair of adjacent roller shafts, said collar terminating in a pivot arm forming a pivot point offset longitudinally of the shafts with respect to the midpoint between the ends of the adjacent roller shafts, the other roller shaft having a pivot point therein co-extensive with the pivot point in the pivot arm in all relative positions of the rollers, and a pivot member connecting the pivot arm, and thus its associated roller, to the said other roller shaft at the co-extensive pivot points to thereby permit flexing movement of the rollers and their respective shafts about the resulting pivotal connecting point to thereby enable the roller carried by said other roller shaft to duck downwardly beneath the said one roller when said rollers deflect.

References Cited in the file of this patent
UNITED STATES PATENTS

| | | |
|---|---|---|
| 754,335 | McCabe | Mar. 8, 1904 |
| 767,824 | McCabe | Aug. 16, 1904 |
| 2,773,257 | Craggs et al. | Dec. 4, 1956 |